A. H. BAKER.
GUTTER.
APPLICATION FILED AUG. 9, 1910.
990,623.
Patented Apr. 25, 1911.
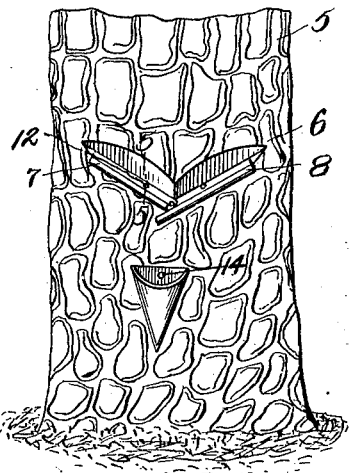
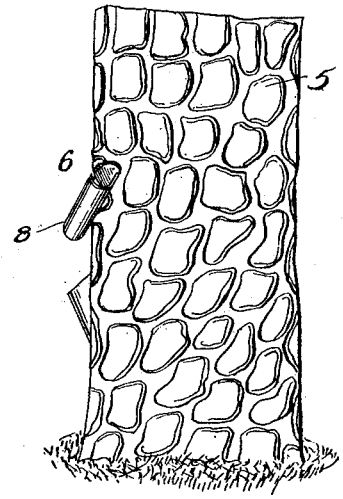
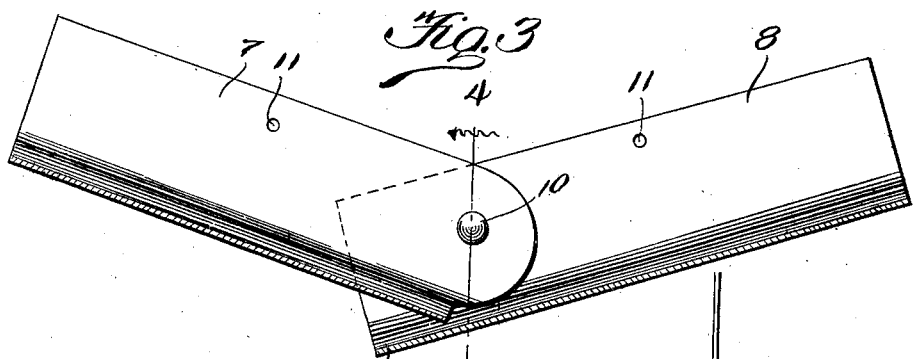
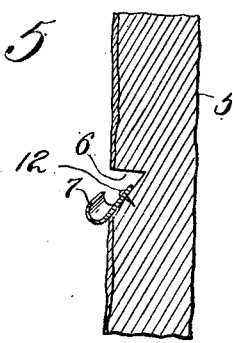
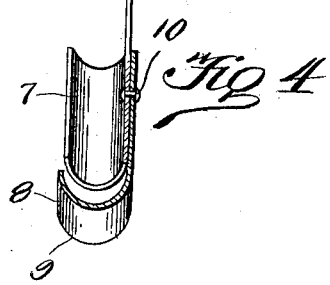
Inventor
Arthur H. Baker
By Victor J. Evans
Attorney
Witnesses
W. S. McDowell

UNITED STATES PATENT OFFICE.

ARTHUR H. BAKER, OF PENSACOLA, FLORIDA.

GUTTER.

990,623.

Specification of Letters Patent.

Patented Apr. 25, 1911.

Application filed August 9, 1910. Serial No. 576,305.

*To all whom it may concern:*

Be it known that I, ARTHUR H. BAKER, a citizen of the United States, residing at Pensacola, in the county of Escambia and State of Florida, have invented new and useful Improvements in Gutters, of which the following is a specification.

The invention relates to a drain gutter, and more particularly to the class of adjustable drain gutters for use on trees or the like.

The primary object of the invention is the provision of a gutter in which the crude gum from a pine tree may be directed into a receiver or the like, the gutter being adjustable so that it may be properly mounted in the streaks or kerfs cut into the trees, so that the drippings from the trees will be discharged into the receiver or the like.

In the streaking of pine trees, whereby the crude gum may be collected therefrom, it is customary for these streaks to be formed irregularly, thus making it difficult to apply the gutters or troughs to the trees, whereby the crude gum may be discharged into a receiver. Therefore, the present invention has been designed whereby the gutter is so constructed that it is capable of being adjusted so that the same may be mounted upon the tree in the streak or kerf cut therein for collecting the crude gum and its discharge into a receiver, and thus obviates any loss of the crude gum by reason of the irregular streaks or kerfs formed in the said tree.

A still further object of the invention is the provision of a gutter in which the sections thereof are pivoted to each other, whereby the said sections may be adjusted angularly with respect to each other for receiving and directing the stream of crude gum from the cuts formed in the trees into a receiver or depository.

With these and other objects in view, the invention consists of the construction, combination and arrangement of parts, as will be more fully described hereinafter, illustrated in the accompanying drawings, and pointed out in the claim hereunto appended.

In the drawings: Figure 1 is an elevation of a tree with the invention applied thereto, and also showing the gum depository or receiver in position on the tree. Fig. 2 is a similar view, looking toward one end of the gutter. Fig. 3 is an enlarged plan view of the gutter removed from the tree. Fig. 4 is a vertical sectional view through the gutter on the line 4—4 of Fig. 3. Fig. 5 is a sectional view on the line 5—5 of Fig. 1.

Similar reference characters indicate corresponding parts throughout the several views of the drawings.

Referring to the drawings by numerals, 5 designates a tree which is blazed or streaked in any approved manner, to form an incision or kerf 6 therein that extends through the bark of the tree to afford an escape of the turpentine or crude gum and permits it to exude therefrom. In the practice of forming the incisions or kerfs in the body of the tree, it frequently happens that the said kerfs are very irregular in contour, that is to say, the V-shaped incision generally made has one of its branches at an acute angle to the other. In order to collect the crude gum or turpentine, there is provided a gutter, as will be hereinafter more fully described.

The gutter comprises independent substantially trough-shaped sections 7 and 8, the latter section being adjustably connected with the section 7 spaced from its drip end 9 by means of a pivot 10, whereby the section 8 may be adjusted at varying angles with respect to the section 7, so that the gutter may assume the desired angular shape correspondingly to the contour of the incision or kerf in the tree body. These sections 7 and 8 of the gutter are provided with suitable apertures or holes 11, through which are passed fasteners, such as tacks 12, by means of which said trough or gutter is secured to the tree. In applying the gutter to a tree, the bark of the latter is cut away to form the incision or kerf, preferably V-shaped, contiguous to which is connected the sections of the gutter, the sections being arranged in inclined position, one of which communicates with the other spaced from its drip end 9, so that the turpentine or gum oozing from the kerf or incision will be directed by the gutter into a receiver, such as a can 13, the latter being of any ordinary well-known type, and secured to the tree by means of a fastener 14 at a point below the location of the gutter. Of course, it is to be understood that the sections 7 and 8 of the gutter are preferably constructed from metal, although the same may be made from any other material, if found desirable.

From the foregoing, it is thought that the construction and operation of the invention will be readily understood without requiring a more extended explanation.

What is claimed is:

In a gutter of the class described, a pair of sections, each being formed with a straight portion with an outwardly and upwardly curled lower edge, the latter being adapted to serve as a drain trough, the inner ends of said sections being overlapped and in contacting relation with each other for a considerable distance, whereby the outwardly and upwardly curled edge of one section will lie below and extend beyond the adjacent outwardly and upwardly curled edge of the other section, a contracted extension formed on the inner end of one section, and a pivot passed through the extension in alinement with the inner end of the outwardly and upwardly curled edge thereof and engaged with the other section for swingingly uniting the said sections, whereby the same will communicate with each other and can be adjusted in various angular positions relative to each other without disrupting the communication therebetween.

In testimony whereof I affix my signature in presence of two witnesses.

ARTHUR H. BAKER.

Witnesses:
C. H. LYMAN,
J. H. BAYLISS.

---

Copies of this patent may be obtained for five cents each, by addressing the "Commissioner of Patents, Washington, D. C."